Nov. 2, 1926.　　　　　　　　　　　　　　　1,605,838
J. B. HAWLEY, JR
INTERNAL COMBUSTION ENGINE AND THE LIKE
Filed Nov. 23, 1925　　　2 Sheets-Sheet 1

Inventor:
John B. Hawley, Jr.
by Dailey & Dailey
Atty.

Nov. 2, 1926.
J. B. HAWLEY, JR
1,605,838
INTERNAL COMBUSTION ENGINE AND THE LIKE
Filed Nov. 23, 1925   2 Sheets-Sheet 2
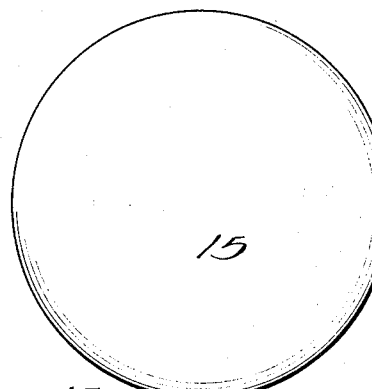
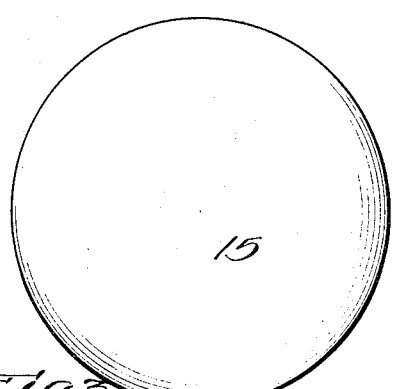
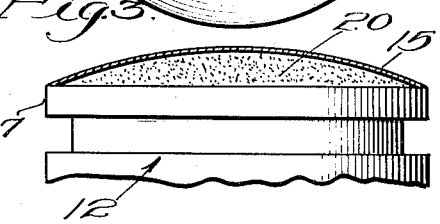
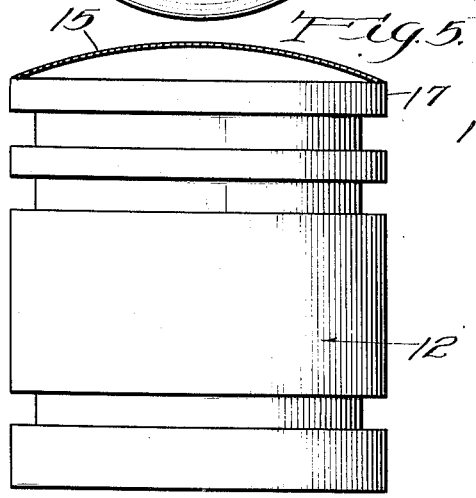
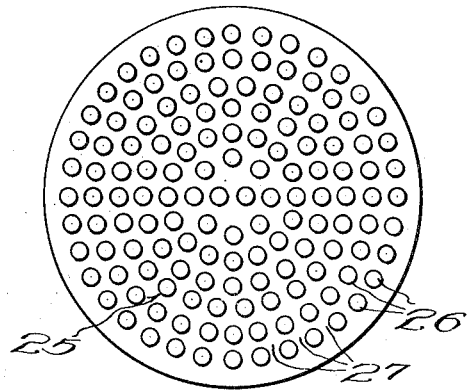
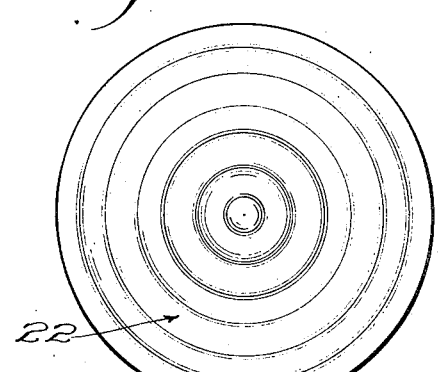
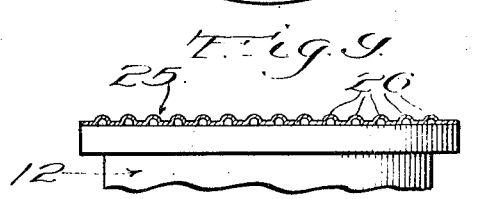
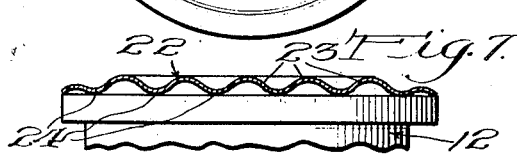
Inventor:
John B. Hawley, Jr.

Patented Nov. 2, 1926.

1,605,838

UNITED STATES PATENT OFFICE.

JOHN B. HAWLEY, JR., OF MINNEAPOLIS, MINNESOTA.

INTERNAL-COMBUSTION ENGINE AND THE LIKE.

Application filed November 23, 1925. Serial No. 70,971.

This invention has reference to improvements in internal combustion engines and the like, by means of which improvements the deposit of carbon on the surfaces exposed to the combustion chamber is greatly reduced and practically eliminated. The desirability of accomplishing the above result is so well understood and appreciated by those skilled in the art that it is unnecessary to explain the same herein in detail.

The deposit of carbon may be avoided in case the surfaces exposed to the gases within the combustion chamber are carried to or maintained at a temperature sufficiently high to insure combustion of the carbon as generated. It is not feasible to maintain the temperatures of surfaces within the combustion chamber sufficiently high to accomplish this result, since manifestly this would cause pre-ignition. It therefore becomes desirable to provide an arrangement whereby the temperatures of the surfaces on which carbon deposit is most aggravated may rise periodically to a sufficiently high temperature to cause combustion of the carbon. This means that said surfaces must likewise cool to a temperature materially below the combustion temperature prior to introduction of the fresh explosive mixture, as otherwise pre-ignition will be caused.

The main object of the invention, therefore, is to provide surfaces within the combustion chamber so constituted that they will alternately heat to the necessary temperature to insure combustion of carbon and thus eliminate accumulated deposit, and to insure sufficient cooling on the other portions of the cycles to avoid pre-ignition. This object of the invention may, therefore, be otherwise expressed by stating that it consists in the provision of a surface or surfaces exposed within the combustion chamber and so constituted as to be capable of extremely rapid heating and cooling for the above purpose.

More particularly, it is the object of the invention to secure the above result by the use of surfaces which are so thin and of such highly heat conductive metal as to insure the necessary extreme rapidity of heating and cooling to enable said surfaces to follow the temperature changes for the above purpose.

Considering the above fact, it is to be further noted that extremely thin metal walls such as are needed to secure the necessary rapidity of temperature response do not have sufficient mechanical strength to withstand the very large pressures of explosion and compression taking place within the combustion chamber. As a consequence, it is still necessary to make use of the usual cylinder and piston elements of the necessary strength and rigidity, associating with them the very thin and highly conductive metal surfaces which will bring about the desired result of eliminating carbon deposit.

In connection with the above, it is to be remembered that the relatively large masses of metal in the cylinder body and in the piston must maintain their relatively high temperatures, and that the thin metal coating which is directly exposed to the action of the gases must be able to fluctuate rapidly through wide temperature ranges. It therefore becomes necessary to establish heat insulating spaces between the body of the piston or cylinder wall and the thin metal coating in order to avoid heat exchange between these parts. At the same time it becomes necessary to make provision for so supporting the thin metal coating with respect to the piston or the body of the cylinder as to give said thin metal coating the necessary mechanical support.

It is therefore an object of the invention to not only provide a very thin metal coating which is heat isolated or insulated with respect to the body of the piston and the body of the cylinder, but is also so supported, either throughout its entire surface or the necessary portions of its surface, as to insure the necessary mechanical strength and support for said surface, in view of the large pressures whi h it must res st.

Other objects and uses of the invention are to provide a very simple and inexpensive form of construction, one which can be very readily applied to existing types of piston and cylinder construction with relatively small change; and one which will be admirably well adapted to perform the service intended.

Other objects and uses of the invention will appear from a detailed description of the same, which consists in the features of construction and combinations of parts hereinafter described and claimed.

In the drawings:

Figure 1 shows a vertical section through a cylinder block having a piston located therein, the piston head and walls of the combustion chamber being provided with a very thin sheet metal coating capable of heating and cooling with sufficient rapidity to avoid carbon deposit, said thin sheet metal coating being firmly supported at all points so as to have the necessary mechanical strength, while at the same time being heat insulated for the purpose intended;

Fig. 3 shows a fragmentary side elevation of the upper portion of a piston surface embodying the features of construction shown in Figs. 1 and 2, the thin sheet metal coating and heat insulating backing being shown in section;

Fig. 4 shows a top plan view corresponding to Fig. 3;

Fig. 5 shows a view corresponding to Fig. 3 except that the entire elevation of the piston is illutsrated and the backing of heat insulating material has been eliminated;

Fig. 6 shows a plan view corresponding to Fig. 5;

Fig. 7 shows a view similar to Fig. 3, with the exception that a modified form of thin sheet metal coating is illustrated, the same being corrugated circularly;

Fig. 8 shows a plan view corresponding to Fig. 7;

Fig. 9 shows another view similar to Fig. 3, illustrating another modified form of construction in which the thin sheet metal coating is provided with a large number of relatively small indentations or raised buttons; and Fig. 10 shows a plan view corresponding to Fig. 9.

Figure 1:
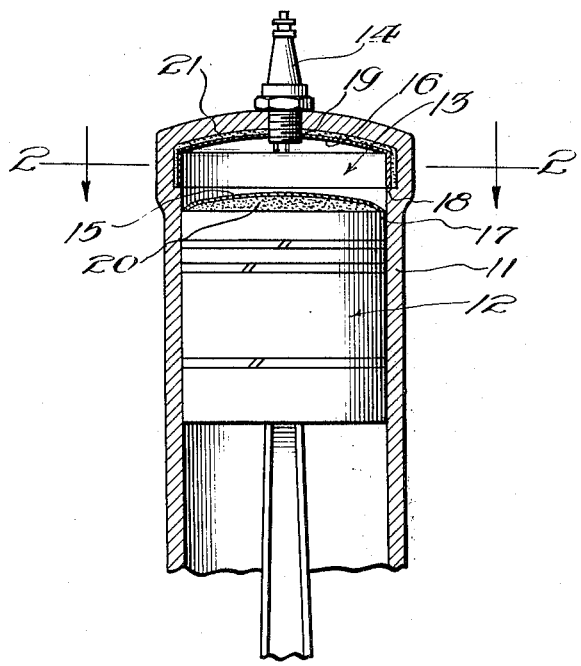
Figure 2:
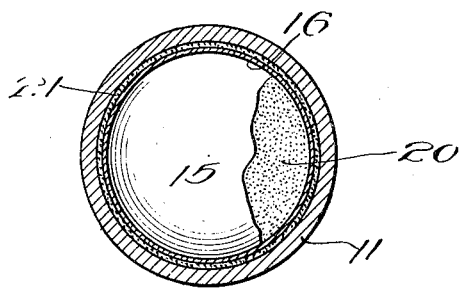
Fig. 2 shows a cross section on the line 2—2 of Fig. 1, looking in the direction of the arrows, a portion of the thin sheet metal coating on the piston head being cut away.

Referring first to Figs. 1 and 2, the cylinder wall is designated by the number 11, and the body of the piston proper by the numeral 12. A combustion chamber 13 is formed in the upper portion of the cylinder and the usual spark plug 14 is provided for firing the charge in the combustion chamber.

According to the present invention, I provide a very thin coating of highly heated conductive sheet metal 15 over the top surface of the piston proper; and in some cases I provide a similar coating 6 over the portions of the combustion chamber which are chiefly exposed to the action of the exploding and burning gases. This coating, 15 or 16 as the case may be, is separated throughout the major portion of its surface from the piston or the surface of the cylinder block a sufficient distance to practically eliminate heat transfer between the thin sheet metal coating and the heavier element with which it is associated. For example, the coating 15 over the piston head is entirely separated from the surface of said piston except around its circular edge 17. As a consequence, metal to metal contact between the piston head and the thin sheet metal coating is practically eliminated. Simultaneously, the coating 16 on the surface of the combustion chamber is separated therefrom except around its outer edge 18 and its inner edge 19 where it comes close to the spark plug.

At this point I would state that the thin sheet metal coatings illustrated in the different figures are necessarily on exaggerated scale as regards thickness, and that as a matter of fact they will have a thickness of only a few thousandths of an inch, possibly five to ten thousandths of an inch. Furthermore, any suitable metal may be used for these thin sheet metal coatings, such as copper, brass, nickel, silver, etc. It is preferred that a metal having a high heat conductivity be used, and also a metal which is very ductile, so that it can be rolled into very thin sheets without breaking or cracking, and also a metal which is tough and has a sufficiently high melting point to avoid fusing.

The extremely thin sheet metal coatings referred to would necessarily collapse under the heavy pressures existing in the combustion chamber unless they were properly supported. Therefore, in Figs. 1 and 2, I have shown a layer of heat insulating material 20 between the coating 15 and the surface of the piston, and another layer of heat insulating material 21 between the coating 16 and the surface of the cylinder block. These layers of material may be of asbestos wool, plaster of Paris, or any other suitable material which will afford the necessary support and at the same time have the necessary heat insulating quality.

The construction shown in Figs. 5 and 6 is similar to that shown in Figs. 1, 2, 3 and 4, with the exception that the layer of heat insulating material has been eliminated and the thin sheet metal coating is supported entirely by metal to metal contact on a very thin line of contact between the parts.

In the construction shown in Figs. 7 and 8, the thin sheet metal coating 22 is provided with a number of circular corrugations 23, by reason of the presence of which the only direct metal to metal contact between the sheet metal coating and the surface of the piston is established around a series of thin concentric lines 24, so that the actual area of contact is very small and the heat insulation is correspondingly perfect.

In the construction shown in Figs. 9 and 10, the thin sheet metal layer 25 is provided with a large number of separate raised portions 26, so that the area of actual contact between the thin sheet metal coating and the surface of the piston is correspondingly reduced, as shown at such portions as 27 in Fig. 10.

I wish to emphasize the fact that the thin sheet metal coating of the present invention bears such a relation to the body of the piston or cylinder block with which it is associated that it is able to fluctuate with extreme rapidity through very wide temperature ranges, whereas the body of the piston or cylinder block remains at substantially a given temperature at all times; that the thin sheet metal coating is so supported as to have the necessary mechanical strength to withstand the heavy gas pressures to which it is subjected, such support being secured from the body of the piston or cylinder block; and that the thin sheet metal coating is, to all intents and purposes, heat insulated from the body of the piston or cylinder block to the extent necessary to insure the proper heat actions.

While I have herein shown and described only certain embodiments of the features of my present invention, still I do not intend to limit myself thereto except as I may do so in the claims.

I claim:

1. The combination, with the top portion of a piston head having the necessary strength for the normal performance of its work within the cylinder, of a thin sheet of metal having a thickness of five to ten thousandths of an inch covering over and separated from the top face of said piston throughout the major portion of the surface thereof to establish a substantial heat insulation between the piston and said sheet metal, together with means establishing mechanical connection between the thin sheet metal and the surface of the piston at points to insure sufficient mechanical rigidity for the thin metal to resist collapse under gas pressure existing within the combustion chamber above it, said sheet metal being of sufficient thinness and heat conductivity to insure heating and cooling thereof substantially in synchronism with the temperature changes of the gases within the combustion chamber, whereby said thin sheet metal coating is capable of rising to a sufficient temperature on the explosion cycle to burn and thereby prevent deposition of carbon and to fall to a sufficiently low temperature on the scavenging stroke to avoid pre-ignition on the ensuing intake stroke, substantially as described.

2. The combination, with the top surface of a piston head having the necessary strength and body for the normal performance of its work, of means for burning and thereby preventing the deposit of carbon from the gases in the combustion chamber, comprising a coating of sheet metal of sufficient thinness and heat conductivity to rise and fall in temperature at temperatures closely approximating the temperature of the gases in the cylinder mechanically in conjunction with the top surface of said piston to secure the necessary mechanical support for said coating to withstand the forces due to gas pressures, and substantially heat insulated from the piston, whereby said coating is enabled to fluctuate in temperature through a sufficient temperature range and with sufficient rapidity to allow the temperature of said coating to rise on the explosion cycle sufficiently high to burn and thereby prevent deposition of carbon and to allow the temperature of said coating to fall on the scavenging stroke sufficiently low to avoid pre-ignition at the speed and conditions of operation existing within the engine, substantially as described.

3. The combination, with the combustion chamber of an internal combustion engine, including the walls of the cylinder and piston, of means for burning and thereby substantially preventing deposition of carbon on a selected wall, comprising a coating of thin sheet metal in conjunction therewith, said thin sheet metal being mechanically supported with respect to the wall in question but substantially heat insulated therefrom, and said thin sheet metal being of sufficient thinness and heat conductivity to allow it to substantially follow the temperature changes of the gases within the combustion chamber, whereby it is able to rise on the combustion cycle to a temperature sufficiently high to burn and thereby substantially avoid deposition of carbon and is enabled to fall on the scavenging cycle to a temperature sufficiently low to avoid pre-ignition, substantially as described.

JOHN B. HAWLEY, Jr.